Figure 1:
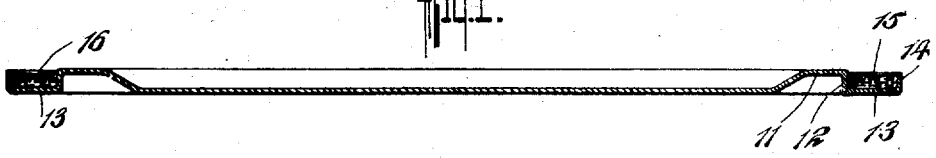

J. BRENZINGER.

METHOD OF FORMING COVERS FOR SHEET METAL CANS.

APPLICATION FILED OCT. 15, 1907.

Reissued May 25, 1909. 12,959.

WITNESSES

Julius Stratt.

Eugene V. Fegan

INVENTOR

Julius Brenzinger

BY

Thos. A. Bowersock

ATTORNEY.

UNITED STATES PATENT OFFICE.

JULIUS BRENZINGER, OF MOUNT VERNON, NEW YORK, ASSIGNOR TO THE MAX AMS MACHINE COMPANY, OF MOUNT VERNON, NEW YORK, A CORPORATION OF NEW YORK.

METHOD OF FORMING COVERS FOR SHEET-METAL CANS.

No. 12,959. Specification of Reissued Letters Patent. Reissued May 25, 1909.

Original No. 845,751, dated March 5, 1907, Serial No. 303,960. Application for reissue filed October 15, 1907. Serial No. 397,595.

*To all whom it may concern:*

Be it known that I, JULIUS BRENZINGER, a citizen of the United States, residing at Mount Vernon, in the county of Westchester and State of New York, have invented certain new and useful Improvements in Methods of Forming Covers for Sheet-Metal Cans, of which the following is a specification.

This invention relates generally to sheet-metal containers, commonly known as "tin cans", wherein the cover or end portion is secured to the body portion by the process known as double-seaming which process, as is well known, comprises the steps of flanging the end edge of the can body, superposing thereon the annular edge of the cover, intercurling or interfolding together these contiguous layers of metal, and compressing the same into a substantially solid bead.

In addition to attaching the cover or end portion to the can body, it is obviously desirable, if not necessary, that the joint be of a character to hermetically seal the container. To insure hermetic sealing, it has been found that a thin layer of suitable composition, adapted to form a packing, be interposed between the layers of metal which are subsequently intercurled or interfolded together. An independent or detached packing ring might obviously be employed for this purpose, but, inasmuch as the separate parts of such containers are usually provided in large quantities for subsequent packing and sealing, the difficulties attendant upon the handling and adjustment of a detached packing ring will be apparent. It is, therefore, the custom to provide one or the other of the parts to be intercurled or interfolded with a suitable composition in the form of a film or lining adhering to such part. Furthermore, with speed and economy in view, the lining or coating of the parts should be done by machinery, and, for the same reasons, should be applied to the cover. In its original state this composition is generally in the form of a mobile liquid, and may obviously be applied to the edge of said cover by means of a brush and in many other well-known ways. In view of the fact, however, that compositions of the desired character and consistency, in liquid form, do not readily adhere to tin plate, and when a brush, or similar means of distributing the liquid composition over the edges of the cover, is employed it often happens that the coating, after drying, will be found to be unevenly distributed, and that portions thereof have, in shrinking or otherwise, peeled off the metal. This lining has also been applied by properly directing a jet of the composition against the edge of the rotating can-cover, but, as heretofore employed, this process has been likewise objectionable for two principal reasons; first, because, as hereinbefore stated, this liquid composition does not readily adhere to tin-plate, and, therefore, when poured upon the same is likely to run or peel off, and, second, there being nothing to retain the liquid upon the cover, in running off, it will drip or drain upon the table, bench, machine or the like to a degree which is invariably objectionable and sometimes fatal to satisfactory results.

The principal object of this invention is to so form a can cover as to receive and retain in proper position the liquid composition, which, upon being applied thereto, will upon drying form a uniform unbroken and evenly distributed film or lining, properly located to form a packing when said cover is applied to and sealed upon the can-body.

My invention will be more readily understood by reference to the accompanying drawings, forming a part of this specification, in which—

Figure 2:
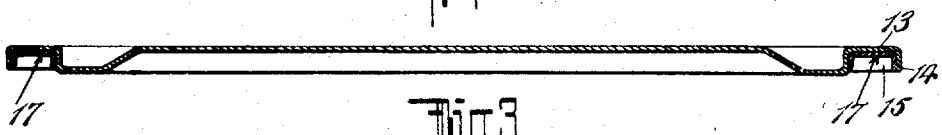
Figure 3:
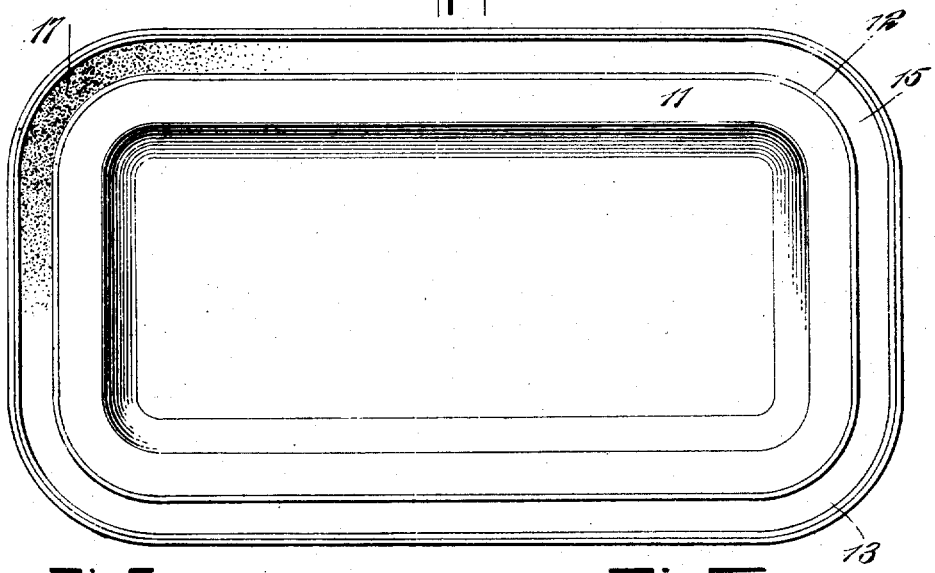
Figure 4:
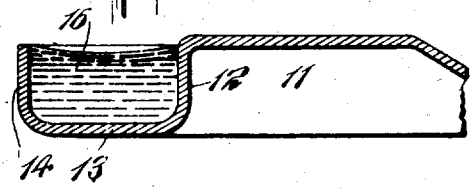
Figure 5:
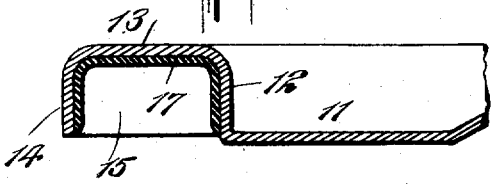

Figure 1 is a central, cross-sectional view of an inverted can-cover provided with an annular groove or gutter, the formation of which is the first step of my invention; Fig. 2 is a similar view of the cover in proper position, the composition having evaporated to leave the packing film or lining. Fig. 3 is a bottom plan view of Fig. 2, and Figs. 4 and 5 are, respectively, enlarged views of the ends of Figs. 1 and 2.

While I have shown a cover for cans of substantially rectilinear configuration, with rounded corners, it will be apparent that the invention is equally applicable to cylindrical or so called "round" cans or containers of any other desired shape. As is well known, these covers are the subject of independent manufacture, and are provided with an annular depression 11, or otherwise formed to provide a shoulder 12, within which a correspondingly shaped chuck is inserted to support the edges of the cover against the seaming mechanism. It is also well-known that the annular projecting edge 13 is superposed upon a flange which is provided at the upper end-edge of the can-body, the chuck later ally supporting these superposed layers which are rolled or curled together by the seaming mechanism. This cover is usually cut and formed at a single operation, and the first step of the present invention is the simultaneous up-turning of the extreme edge 14 to provide the endless groove or gutter 15. Into this gutter is poured, at the proper time, the composition referred to, which in its primary state is an exceedingly thin or mobile fluid and of a consistency to flow freely into said gutter and throughout the extent thereof. This composition, being of such thin consistency, will be materially reduced in bulk or volume by evaporation, and, therefore, if I substantially fill this groove or gutter 15 with such composition—which, being of a viscous character, will adhere to the portions of the cover with which it comes in contact—it will, upon drying or partially drying, be reduced to a thin film or lining-skin which coats each side wall as well as the bottom of this gutter to an extent measured by the original depth of the liquid in the gutter. In other words, substantially the entire width of that portion of the cover-edge which is superposed upon the edge-flange of the body-portions for the purpose of double seaming, will be uniformly coated. These covers, therefore, when in the position indicated in Fig. 1, may be in any manner subjected to the delivery of composition from any suitable source, such as a spout or nozzle, and the gutter 15 substantially filled with the thin mobile liquid. They are then placed to one side and sufficient time for evaporation is allowed to elapse to provide the thin film or coating 17. The cover is now in condition to be applied to the can body and the seaming operation effected.

I claim as my invention:

1. The method of forming a cover for sheet metal containers which consists in shaping the blank to provide a circumferential gutter therein, flowing a liquid lining-composition into said gutter to substantially fill the same, and evaporating said composition to form a lining-skin within said gutter.

2. The method of forming a cover for sheet-metal cans, which consists in forming a circumferential gutter on said cover, flowing a lining composition into the gutter so as to completely fill the same, and evaporating said composition to form a lining-skin within the gutter, substantially as specified.

In testimony of the foregoing, I have herewith set my hand in the presence of two witnesses.

JULIUS BRENZINGER.

Witnesses:
M. A. Frisse,
R. C. Weishampel.